United States Patent Office 3,847,904
Patented Nov. 12, 1974

3,847,904
METHOD OF PREPARING 5,6-DIHYDRO-11-MORPHANTHRIDONES
Alexander E. Drukker, Milwaukee, and Claude I. Judd, Mequon, Wis., assignors to Colgate-Palmolive Company, New York, N.Y.
No Drawing. Filed Oct. 5, 1972, Ser. No. 295,130
Int. Cl. C07d 41/08
U.S. Cl. 260—239 D          4 Claims

ABSTRACT OF THE DISCLOSURE

The 5,6-dihydro-11-morphanthridones are prepared in high yield by the selective reduction of the corresponding 6-halo-11-morphanthridone with a Raney nickel or precious metal catalyst in the presence of an unreactive ester or ether solvent and a hydrogen halide acceptor. The 5,6-dihydro-11-morphanthridones are useful intermediates in the preparation of 11-(substituted)aminoalkylidene-5,6-dihydromorphanthridines which are pharmacologically active compounds.

BACKGROUND OF THE INVENTION

The preparation of 5,6-dihydro-6-morphanthridones by the catalytic reduction of the corresponding morphanthridine-6,11-diones has been described in an article by Carrona, et al., *Gazz. Chim. Ital.*, vol. 83, p. 533 (1953), and U.S. Pat. No. 2,973,354. However, the processes described in the forementioned references cannot be used to prepare the 5,6-dihydro-11-morphanthridones.

DETAILED DESCRIPTION

In the preferred practice of the present invention, the 6-chloro-11-morphanthridone is dissolved in an unreactive solvent ether or ester such as dioxane or ethyl acetate. The resulting solution is treated with hydrogen under pressure, about 60 p.s.i., in the presence of a hydrogen halide acceptor, preferably a tertiary amine such as triethylamine, and in the presence of a Raney nickel or precious metal catalyst such as palladium-on-carbon. The reaction is conducted at about 25° C. until hydrogen uptake ceases.

The described process may be illustrated as follows:

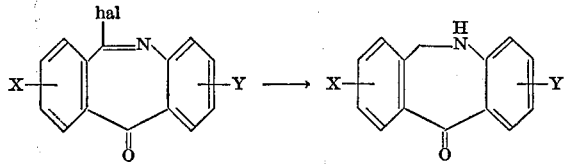

wherein hal is chlorine or bromine and X and Y are ring substituents that do not partake in or interfere with the reaction, such as hydrogen, lower alkyl of 1 to 4 carbons, lower alkoxy of 1 to 4 carbons, halo, trifluoromethyl, amino, arylamino or sulfonylamido.

The 6-halo-11-morphanthridones that may be employed as starting materials may be prepared as described in *Helv. Chim. Acta.*, 49, 1433 (1966), or by other known methods.

Representative of the 6-halo-11-morphanthridones which can be used are the following:

2,6-dichloro-11-morphanthridone,
3,6-dichloro-11-morphanthridone, and
8,6-dichloro-11-morphanthridone.

Representative of the 5,6-dihydro-11-morphanthridones that can be prepared by the described process are the following:

2-chloro-5,6-dihydro-11-morphanthridone,
3-chloro-5,6-dihydro-11-morphanthridone, and
8-chloro-5,6-dihydro-11-morphanthridone.

The 5,6-dihydro-11-morphanthridones obtained by the described process may be alkylated by conventional techniques to form the corresponding 5-alkyl-5,6-dihydro-11-morphanthridones which can in turn be used to prepare the 11-(substituted)aminoalkylidene - 5,6 - dihydromorphanthridines of U.S. Pat. No. 3,381,000.

The process of the present invention is further described in the following examples:

EXAMPLE 1

5,6-Dihydro-11-morphanthridone

A Parr bottle is charged with 7.55 g. of 6-chloro-11-morphanthridone, 100 ml. of dioxane, and 5 g. of triethylamine and the solution hydrogenated at 50 lbs. pressure at 25° over dioxane-washed Raney nickel. After the hydrogen uptake has stopped, the solution is filtered off, the filtrate concentrated and the residue dissolved in benzene and washed with water. The organic solution is concentrated, and the residue recrystallized from 30 ml. of toluene to afford 4.55 g. of 5,6-dihydro-11-morphanthridone, m.p. 120–124°.

EXAMPLE 2

5,6-Dihydro-11-morphanthridone

A Parr bottle is charged with 12.6 g. of 6-chloro-11-morphanthridone, 225 ml. of ethyl acetate, and 7.5 g. of triethylamine and the solution hydrogenated at 40 lbs. pressure at 25° over 1 g. of 10% palladium-on-carbon. After workup identical to that of Example 1, 9.75 g. of 5,6-dihydro-11-morphanthridone is obtained, m.p. 122–123°.

We claim:
1. The method of preparing compounds of the formula

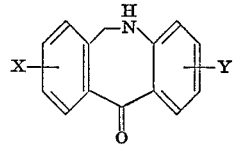

wherein X and Y are selected from hydrogen, lower alkyl of 1 to 4 carbon atoms, lower alkoxy of 1 to 4 carbon atoms, halo, trifluoromethyl, amino or sulfonylamido, which comprises dissolving a compound of the formula

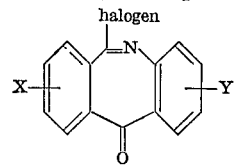

in which X and Y are as defined, in an unreactive solvent selected from an ether or ester and reacting said compound with hydrogen under a pressure of about 60 lbs. p.s.i. at about 25° C. in the presence of a hydrogen halide receptor and a catalyst selected from Raney nickel or palladium-on-carbon.

2. The method of claim 1 in which the halogen is chlorine and X and Y are hydrogen.

3. The method of claim 1 in which the starting material is dissolved in dioxane and the reaction is conducted at 25° C. under 50 lbs. of hydrogen pressure in the presence of a Raney nickel catalyst.

4. The method of claim 1 in which the hydrogen halide acceptor is a tertiary amine.

References Cited

UNITED STATES PATENTS 3,381,000   4/1968   Drukker et al. _____ 260—239 D

HENRY R. JILES, Primary Examiner
R. T. BOND, Assistant Examiner